Figure 1:
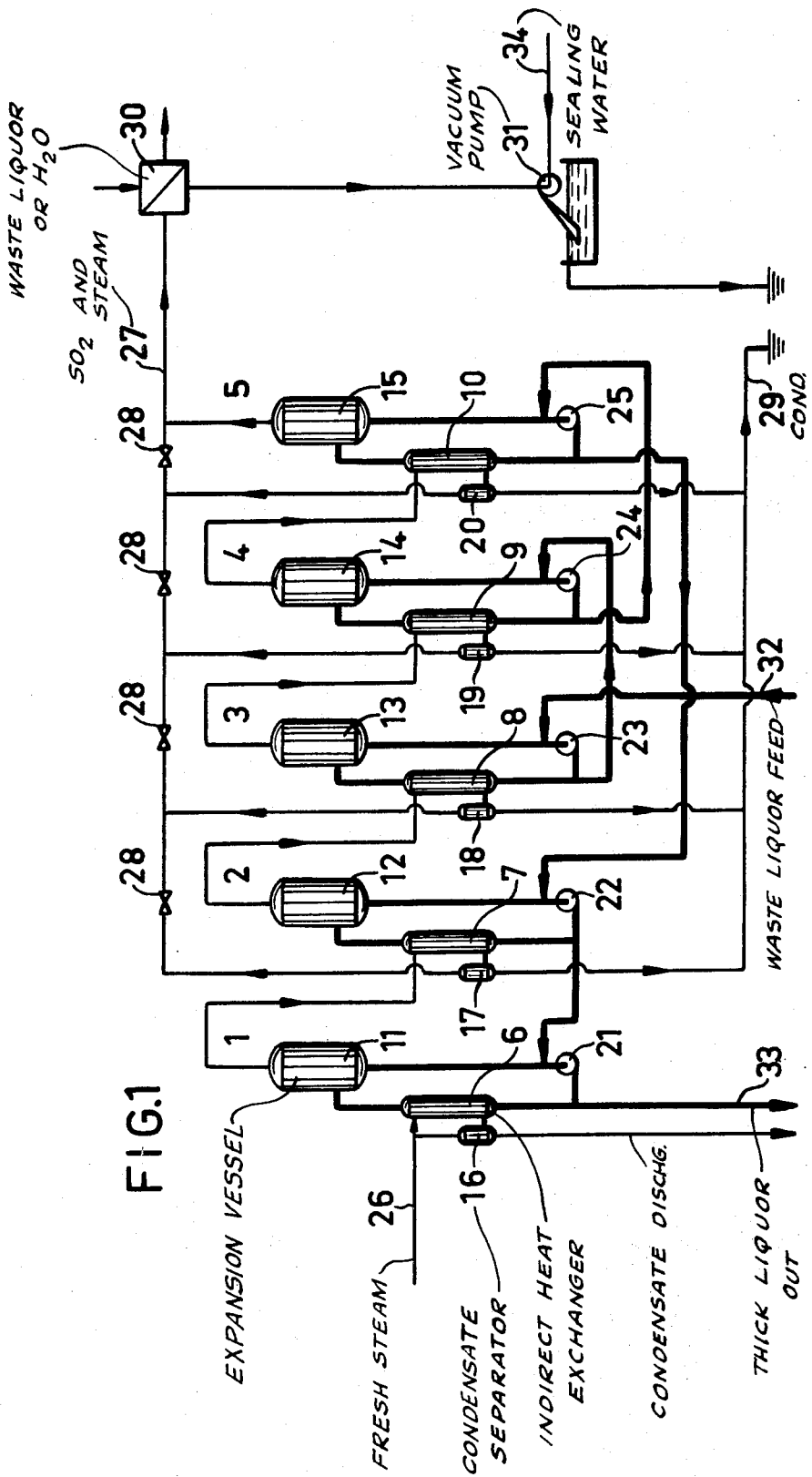

United States Patent
Andersson et al.

[15] 3,675,707
[45] July 11, 1972

[54] PROCESS AND DEVICE FOR RECOVERING SULFUR DIOXIDE FROM WASTE SULFITE LIQUOR

[72] Inventors: Per-Erik Andersson, Sundsvall; Carl Arne Bergholm, Nynashamn, both of Sweden

[73] Assignee: Svenska Cellulosa Aktiebolaget, Sundsvall, Sweden

[22] Filed: Dec. 8, 1969

[21] Appl. No.: 882,881

[30] Foreign Application Priority Data

Dec. 9, 1968   Sweden..............................16784/68

[52] U.S. Cl.............................159/20, 159/47 WL, 162/36
[51] Int. Cl.................B01d 1/26, B01d 1/100, D21c 11/02, D21c 11/12, D21c 11/14
[58] Field of Search..................162/36; 159/47 WL, 20, 17; 23/131, 48; 92/2; 417/88 X; 230/79

[56] References Cited

UNITED STATES PATENTS

| | | |
|---|---|---|
| 2,874,043 | 2/1959 | Lockman......................................92/2 |
| 2,937,499 | 5/1960 | Klemt......................................417/88 X |
| 2,941,590 | 6/1960 | Rosenblad......................159/47 WL |
| 3,032,258 | 5/1962 | Jennings..................................230/79 |
| 2,993,753 | 7/1961 | Collins, Jr..................................23/48 |
| 2,385,955 | 10/1945 | Tomlinson..............................23/131 |
| 2,896,705 | 7/1959 | Rumen......................159/47 WL |
| 3,463,216 | 8/1969 | Miles II......................159/47 WL |
| 3,153,609 | 10/1964 | Markant et al. ..........................162/36 |

*Primary Examiner*—Norman Yudkoff
*Assistant Examiner*—J. Sofer
*Attorney*—Pierce, Scheffler & Parker

[57] ABSTRACT

Sulphite waste liquor is concentrated in a plural effect evaporator; the so-removed vent steam containing $SO_2$ is cooled at low pressure and the condensate discharged; and the resulting gas rich in $SO_2$ is compressed to atmospheric pressure in a vacuum pump requiring little or no sealing water.

4 Claims, 3 Drawing Figures

PROCESS AND DEVICE FOR RECOVERING SULFUR DIOXIDE FROM WASTE SULFITE LIQUOR

In the production of cellulose pulp according to the so-called sulphite method, finely divided vegetable material, for example wood chips, is subjected to a treatment, at a high pressure and high temperature, in digesters, with an aqueous solution or the cooking liquid containing substantially bisulphite or a mixture of bisulphite and dissolved sulphur dioxide. Calcium ions, ammonium ions, magnesium ions and sodium ions widely have been used as the cations in the cooking liquids. By this treatment a greater or lesser part of the lignin content of the wood is dissolved out as lignosulphonic acids, the cellulose of the wood being obtained as cellulose pulp which can be utilized for the production of textile materials, paper etc. In sulphite cooking one can distinguish between two basic cooking processes, viz. acid sulphite cooking and bisulphite cooking. In acid sulphite cooking there is used a cooking liquor which contains a bisulphite solution with a high content of free sulphur dioxide dissolved therein. In bisulphite cooking the cooking liquor substantially contains bisulphite and no or only an insignificant content of free sulphur dioxide.

After completion of the cooking, the digester is cooled by a pressure reduction whereby part of the steam boils off. During this degassing sulphur dioxide also is removed from the waste liquor. In acid sulphite cooking, where the cooking liquor consists of a bisulphite solution with free sulphur dioxide dissolved therein, all or substantially all of the dissolved sulphur dioxide is removed. In acid sulphite cooking this amount of removed sulphur dioxide is very great and it is recovered in known way in the cooking liquor preparation system. In bisulphite cooking relatively small amounts of sulphur dioxide are removed which also can be recovered in the preparation of cooking liquor, if such recovery is deemed suitable. The waste liquor obtained after the degassing of the digester contains (a) dissolved wood substance partly being bound to chemicals of the cooking liquor, and (b) inorganic chemicals from the cooking liquor where the anions are present as bisulphite ions.

Subsequent to the degassing of the charge, the waste liquor obtained is separated from the cellulose pulp.

In order to utilize the heat value of the organic wood substance contained in the waste liquor, and possibly to recover the inorganic chemicals of the waste liquor, the resulting waste liquor which subsequent to the separation from the cellulose pulp contains about 5–25 percent dry substance, is evaporated to a dry content of about 45–60 percent.

Subsequent to the evaporation the waste liquor is subjected to burning or pyrolysis whereby the organic substance is burnt to water and carbon dioxide, while the cations in certain cases either directly or via known methods are converted into such a form, usually to oxides or carbonates, that they can again be used for the preparation of cooking liquor, whereby the oxide or carbonate in aqueous solution or aqueous suspension is reacted with sulphur dioxide.

In the evaporation of sulphite waste liquors part of the sulphur dioxide of the waste liquor is removed, in an amount corresponding to up to 30 percent of the sulphur dioxide content in the ingoing release liquor. The removal of part of the sulphur dioxide in the waste liquor during the evaporation is due to the fact that the inorganic chemicals of the waste liquor are present in the form of a bisulphite solution. A bisulphite solution in is equivalence with a certain partial pressure of sulphur dioxide gas. It is, therefore, possible to remove part of the sulphur dioxide contained in the bisulphite solution in connection with the evaporation of the waste liquor. The partial pressure of sulphur dioxide above the waste liquor, however, is so low that either very great steam amounts have to be removed or the removal has to be carried out in a great number of steps, for example in a column still, for effecting the removal of a substantial part of sulphur dioxide from the waste liquor.

The amount of sulphur dioxide removed from the liquor during the evaporation of a sulphite waste liquor is determined by the bisulphite content in the waste liquor and by the amount of evaporated water. A higher bisulphite content in the waste liquor yields a higher partial pressure of sulphur dioxide above the waste liquor and, therefore, the sulphur dioxide content in the steam boiled off increases with increasing bisulphite content. An increase in the amount of steam boiled off, of course, implies an increase in the removal of sulphur dioxide.

Heretofore the cooking method usually applied to sulphite cooking was acid sulphite cooking, in which method the cooking liquor, as already mentioned, is a bisulphite solution containing a high content of dissolved free sulphur dioxide. It is characteristic of this cooking method that the base content--and thereby the bisulphite content in the cooking liquor--is relatively low, but that the content of dissolved sulphur dioxide is high. This cooking method is applied, above all, when the base is calcium, because the low solubility of the calcium bisulphite sets a limit to the bisulphite content. Besides, acid sulphite cooking is used only in cooking to low cellulose yields, for which reason the content of organic substance, and, thus, the dry content in the waste liquor after the cooking, is high.

The highest cellulose yield in acid sulphite cooking is obtained at the production of paper pulp, where the cellulose yield amounts to at maximum 53 percent. The base quantity charged can amount to at maximum 50 kg of bound $SO_2$ per ton of wood.

In the cooking of dissolving pulp with calcium as base, the quantity of base charged amounts to about 30 kg of bound $SO_2$ per ton of wood, and the cellulose yield is about 46 percent.

These digester charges effect, in acid sulphite cooking, the following relations between inorganic dry substance and organic dry substance in the waste liquor, the quantity of inorganic dry substance being expressed in terms of the unit kilogram equivalents base:

| Cellulose Yield % | Charged base quantity kg bound $SO_2$ per ton wood | Relation of inorganic dry substance to organic dry substance in waste liquor, kilogram equivalents base per kg organic dry substance |
|---|---|---|
| 53 | 50 | 0.0035 |
| 47 | 30 | 0.0020 |

Latterly the other of the aforementioned cooking methods, the bisulphite process, has come into use to a greater extent. This method presupposes the use of soluble bases, above all sodium or magnesium. It is characteristic of this cooking method (a) that, apart from the fact that the cooking liquor consists of a bisulphite solution with no or a small content of dissolved sulphur dioxide, the required charge of chemicals calculated per ton of wood is relatively high, and (b) that it is possible by this cooking method to produce pulp at higher cellulose yields. These cooking methods then produce a waste liquor containing a high content of bisulphite and a lower content or organic dry substance. The relation between inorganic dry substance and organic dry substance in these waste liquors is higher than in the case of acid sulphite cooking.

In bisulphite cooking the cellulose yield is between at minimum about 50 percent and at maximum about 75 percent. The charge of chemicals expressed in kg of bound $SO_2$ per ton of wood depends on the cellulose yield. The relation between the required charge of chemicals, cellulose yield and the relation between inorganic and organic dry substance in the waste liquor at bisulphite cooking is as follows:

| Cellulose yield % | Charged chemical quantity kg bound $SO_2$ per ton wood | Relation of inorganic dry substance to organic dry substance in waste liquor, kilogram equivalents base per kg organic dry substance |
|---|---|---|
| 50 | 70 | 0.005 |
| 60 | 60 | 0.005 |
| 70 | 80 | 0.009 |

Compared with acid sulphite cooking, the waste liquor from bisulphite cooking contains a substantially higher content of bisulphite. The quantity of cooking liquor in sulphite cooking is determined by the necessity of supplying a certain cooking liquor quantity to the digester in order to bring about a satisfactory circulation of the cooking liquor. The quantity of cooking liquor to be charged amounts to about 2.5–3 m³ cooking liquor per ton of wood charged. In bisulphite cooking to higher cellulose yields the resulting waste liquor will contain a lower dry content than in acid sulphite cooking. Compared with acid sulphite cooking it is, therefore, necessary to evaporate a greater water quantity in order to obtain the same dry content in the evaporated waste liquor. Owing to the two aforesaid factors, the quantity of sulphur dioxide removed in the evaporation of waste liquor from bisulphite cooking will be greater than in the evaporation of waste liquor from acid sulphite cooking. In evaporation experiments carried out on a laboratory scale with a high-yield sulphite liquor from bisulphite cooking of spruce with sodium as base to a cellulose yield of about 70 percent and with an addition of chemicals of 85 kg of bound $SO_2$ per ton of wood, the following relation between the quantity of steam removed during the evaporation and the quantity of sulphur dioxide removed simultaneously was obtained. The waste liquor prior to the evaporation had a dry content of 10.3 percent by weight. The evaporation was carried out at atmospheric pressure. The quantity of water boiled off and the quantity of sulphur dioxide removed are expressed in terms of kg of dry substance in the waste liquor.

| Steam quantity removed kg/kg dry substance | SO₂ quantity removed g/kg dry substance |
|---|---|
| 1 | 22.5 |
| 2 | 37.0 |
| 3 | 44.5 |
| 4 | 51.0 |
| 5 | 56.5 |
| 6 | 61.5 |
| 7 | 66.0 |
| 8 | 70.0 |

The removal of sulphur dioxide, as is evident from the Table, takes place rapidly at the beginning and thereafter becomes slower, but the removal continues during the entire evaporation process.

A known method of recovering this sulphur dioxide is by removing the sulphur dioxide in a column still by steam. Hereby a concentrated sulphur dioxide gas is obtained which can be used again in preparing a fresh supply of cooking liquor. This method of recovery involves the disadvantage that it requires an extra distillation plant with resulting higher initial costs, and that the column still consumes steam which lowers the heat economy of the evaporation plant.

It is also possible to recover heat and $SO_2$ from heated $SO_2$-containing sulphite waste liquor. The method in principle is carried out in such a way that the removal of steam and sulphur dioxide from a heated sulphite waste liquor takes place in several steps without supplying additional heat from outside. The removal is so effected that the liquor is subjected, stepwise to an increasing vacuum whereby a certain quantity of steam and $SO_2$ is removed. The heat required therefor is taken from the heat content of the liquor itself, so that the liquor temperature decreases in steps. The removal of steam and heat from a waste liquor can be carried out, for example, with a temperature of 85° C. which according to the method is cooled to a temperature of 40° C. When treating in this way 1,000 kg of a waste liquor with a dry content of 10 percent by weight by so reducing the pressure in steps that the temperature of the waste liquor decreases from 85° to 40° C., simultaneously a steam removal takes place which amounts to about 72 kg steam/1,000 kg ingoing waste liquor or 0.72 kg steam/kg dry substance in the waste liquor. When, however, the same waste liquor is subjected to an evaporation to 50 percent dry content, the quantity of steam removed amounts to 800 kg/1,000 kg waste liquor or 8 kg steam/kg dry substance in the waste liquor.

The quantity of sulphur dioxide which can be expected to be removed in a conventional method for removing such a small steam quantity with a simultaneous cooling of the liquor, will be insignificantly small in comparison to the quantity removed in the evaporation of the waste liquor to 50 percent dry content.

It has not been possible, with the technique and apparatus equipment heretofore used for the evaporation of sulphite waste liquors, to recover this sulphur dioxide in an economical way, but it was recovered in the form of a highly diluted aqueous solution of sulphur dioxide which usually was discharged into the factory sewer.

As sulphur dioxide solutions discharged into recipients rapidly react with dissolved hydrogen in the recipient, said discharge also implied a load on the recipient.

The present invention is based on the observation that the removal of sulphur dioxide during the evaporation of sulphite waste liquor continues during the entire evaporation process, and that the sulphur quantity removed, particularly in the evaporation of bisulphite waste liquor, is so great that the sulphur dioxide quantity economically should be utilized. The invention relates to a method of recovering the main part of the sulphur dioxide removed in the evaporation plant, without appreciably increasing the initial costs of the plant and without causing the steam consumption to exceed the quantity used when the evaporation is carried out in a conventional way. The evaporation of sulphite waste liquor usually is carried out in several steps or effects, in order to render possible a good heat economy.

Figure 2:
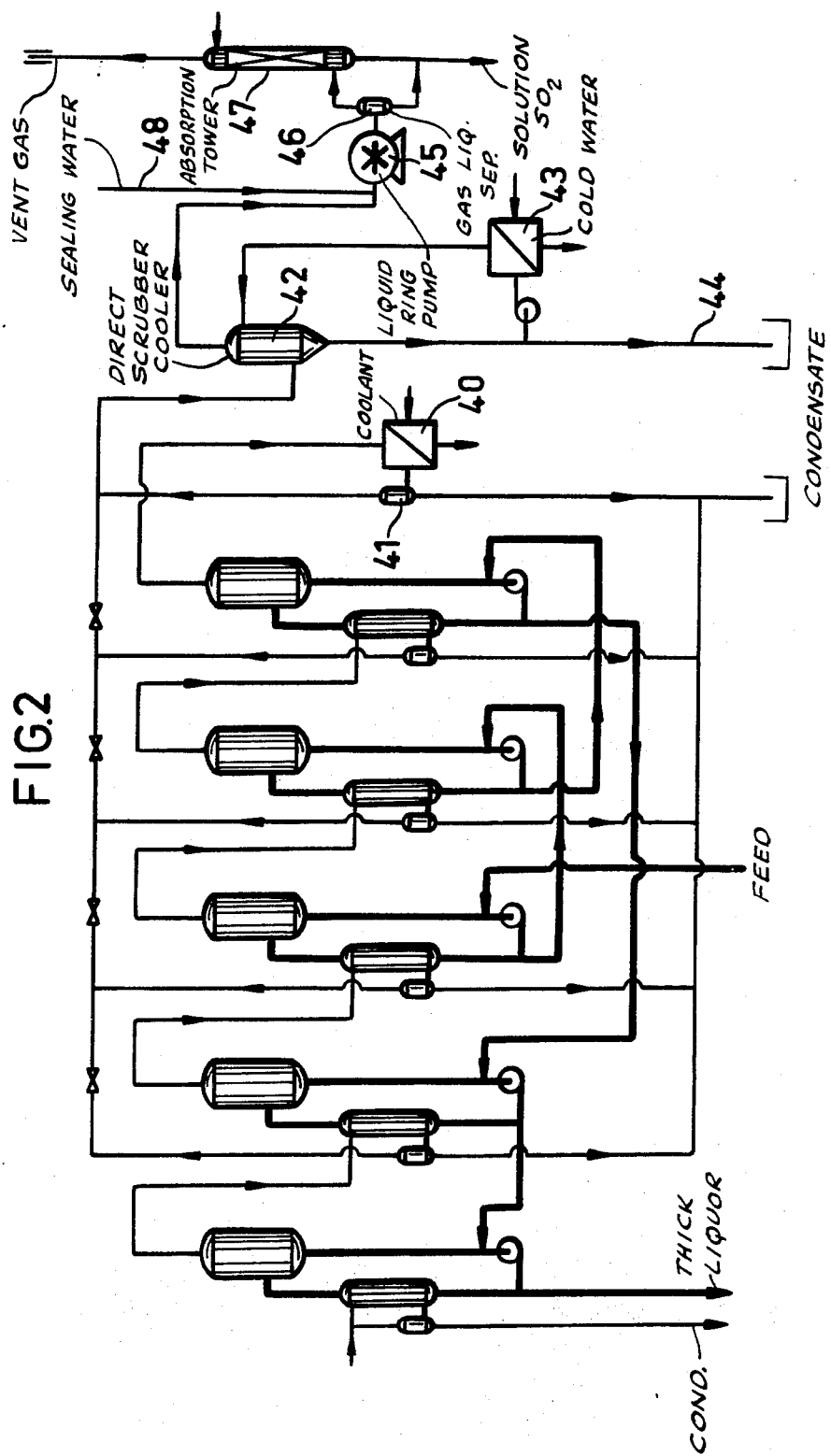
Figure 3:
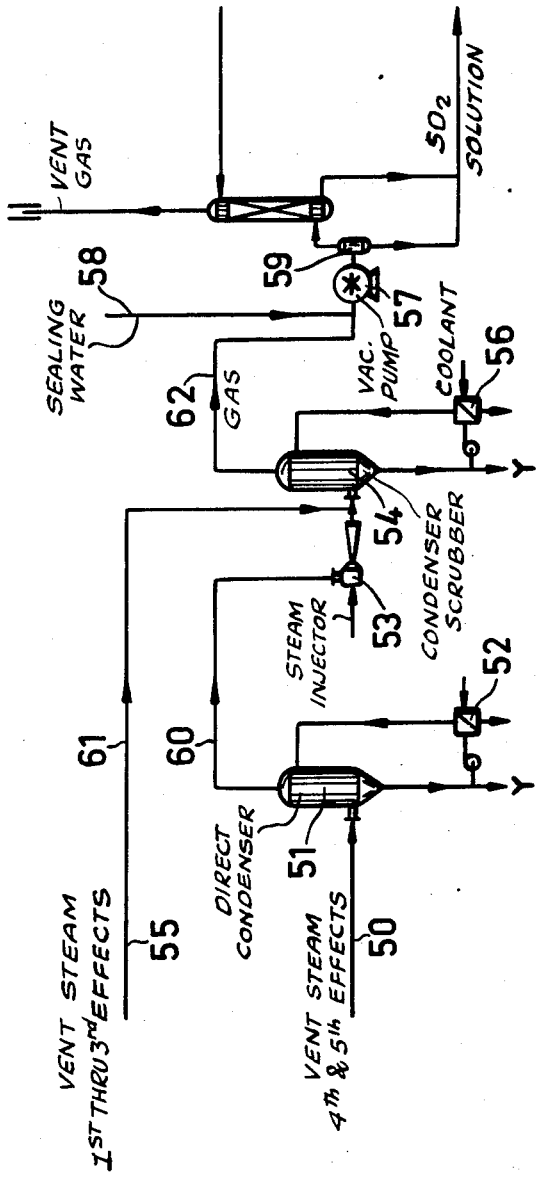

The invention will now be described in greater detail and with reference to the appended drawing, in which FIG. 1 is a diagrammatic representation of an evaporation plant operable in the present relation;

FIG. 2 represents one form of vacuum system which can be integrated into the evaporation plant; and FIG. 3 represents a simpler form of operable vacuum system.

FIG. 1 shows an evaporation plant comprising five effects, 1–5, each effect comprising a heat exchanger, for example, 6–10, an expansion vessel, for example, 11–15, a condensate separator, for example 16–20 and a circulation pump, for example, 21–25. The evaporation plant further comprises the vent line 27 with throttlings 28, a condensate line 29, a heat exchanger 30 and a vacuum pump 31.

The evaporation plant, furthermore, includes pumps for the pumping of waste liquor between the effects, heat exchangers for the heat exchanging of condensate and waste liquor, and control equipment. As the equipment details are of no interest in the present connection, they are not shown in the drawing.

The waste liquor flowing to the evaporation plant, i.e., the release liquor, is supplied through the conduit 32 to the effect No. 3 of the evaporation plant where it gives off part of its water. From the effect 3 the waste liquor is led to the effects 4, 5, 2 and 1, in this order. At each step part of the water is given off, and the waste liquor after completed evaporation, i.e., the thick liquor, leaves the effect 1 through the conduit 33. The order of effects may be different from the aforesaid.

The pressure in the different effects is determined by the vacuum pump 31 and throttlings 28 in the vent line, so that the pressure and temperatures in the expansion vessels of the effects are about as follows:

| Effect No. | Pressure atm. | Temperature °C |
|---|---|---|
| 1 | 2.0 | 120 |
| 2 | 1.2 | 104 |
| 3 | 0.66 | 88 |
| 4 | 0.34 | 72 |
| 5 | 0.16 | 55 |

The waste liquor in effect 1 is heated with fresh steam supplied through steam line 26 to heat exchanger 6 of the effect. The fresh steam condensate is separated in condensate separator 16 and leaves the system.

The boiling off of water from the waste liquor in the first effect takes place in expansion vessel 11, where steam is separated from the waste liquor. The steam, together with inert gases (substantially sulphur dioxide and small amounts of air, carbon dioxide and volatile organic impurities), is led to heat exchanger 7 in the effect 2 where the main part of the steam condenses and heats the circulating waste liquor. The resulting condensate is separated from the inert gases in the condensate separator 17. The condensate is led to condensate line 29. Part of the sulphur dioxide content in the steam dissolves in the condensate, but the main part mixed with other inert gases and vent steam leaves the system through throttlings 28 in vent line 27 and flows to the vacuum system.

In a corresponding way, the steam quantity boiled off in effect 2 is led to the heat exchanger 8 in the effect 3 where the main part of the steam condenses and heats the circulating waste liquor in the third effect. Part of the sulphur dioxide in the steam from the second effect dissolves in the condensate, but the main part goes off with the vent steam to the vacuum system via throttlings 28 and vent line 27. In a corresponding way, the subsequent effects are heated with steam from the effect next before. From all effects except the last one, the main part of removed sulphur dioxide goes off with the vent steam and is led to the vacuum system.

The steam boiled off from the last effect usually is discharged directly to the vacuum system, as appears from FIG. 1.

The vacuum system comprises a heat exchanger 30 which effects heat exchange of vent steam and steam from the last effect with cold water. Instead of water, waste liquor can be used as coolant. Hereby part of the steam condenses. The remainder of the steam, together with part of the sulphur dioxide and other inert gases, flows to vacuum pump 31. Said pump is a usual so-called WL-pump operating with great quantities of sealing water supplied through the sealing water line 34. The WL-pump used substantially operates as a water-jet pump. It has a high capacity and produces a high vacuum. The capacity of the pump can easily be adjusted by control of the sealing water. The pump shows the disadvantage that it requires great sealing water quantities. Hereby all sulphur dioxide dissolves in the sealing water at so low a concentration, <0.1 percent, that it is not possible economically to recover this sulphur dioxide quantity. The sealing water, therefore, is led to the sewer, and the sulphur dioxide is lost.

The present invention also relates to a method of so designing the vacuum system of an evaporation plant, that the main part of the sulphur dioxide removed can be recovered as a gas or as a concentrated aqueous solution. The invention in principle implies that the major part of the steam removed from every effect is condensed by indirect heat exchange, and that simultaneously the main part of the sulphur dioxide content in the steam, mixed with steam, so-called vent steam, is blown to the vacuum system of the evaporation plant where the steam is condensed in direct contact heat exchangers with circulating cooling water. The resulting condensate is drawn off. Owing to the fact that this cooling is carried out at such a low pressure, the partial pressure of the sulphur dioxide in the gas-steam mixture is so low that sulphur dioxide loss in the condensate is avoided. As the heat exchange takes place in direct contact with water, substantially all steam can be condensed out. The gas quantity to be compressed to atmospheric pressure is small and consists substantially of sulphur dioxide and inert gas, for example air which has leaked into the vacuum effects of the evaporation plant. The vacuum pumps used may be steam ejectors or positive vacuum pumps which require no or little sealing water, for example piston pumps, rotary dry vacuum pumps or preferably liquid ring vacuum pumps. From the evaporation plant, subsequent to the vacuum pump, the sulphur dioxide is obtained in the state of gas with high sulphur dioxide content or as a mixture of gas and aqueous solution, both containing so high a sulphur dioxide content that the mixture can be used in the process, for example for producing cooking liquor.

An embodiment of this aspect of the invention is shown in FIG. 2. The water vapor boiled off in the last effect with inert gases first is cooled by indirect heat exchange with cooling water in heat exchanger 40, and condensate as well as vent steam are separated in condensate separator 41. All vent steam is led to a direct heat exchanger 42, (a scrubber cooler), where substantially all steam is condensed with circulating scrubber water cooled in the heat exchanger 43. A water quantity corresponding to the amount of steam condensed out leaves the circulation circuit through the conduit 44. The cooled gas containing very little steam and holding a high content of sulphur dioxide is led to a liquid ring vacuum pump 45. Part of the sulphur dioxide dissolves in the sealing water of the vacuum pump, which is supplied through a conduit 48, to a strong aqueous solution of sulphur dioxide which is separated from the gas in the liquid separator 46 of the vacuum pump. The gas which still has a high sulphur dioxide content can directly be used for the preparation of cooking liquor or, as indicated in FIG. 2, be absorbed in water in an absorption tower 47 whereby a strong aqueous solution of sulphur dioxide is obtained which can be used for the production of cooking liquor.

An embodiment of the vacuum system requiring a lower amount of initial capital is shown in FIG. 3. The vent steam from the fourth and fifth effects is blown via a conduit 50 to a direct condenser 51 where the steam condenses upon contact with circulating cooling water cooled in a heat exchanger 52. The gas from the direct condenser 51 is compressed to a suitable pressure by a steam ejector 53. The final pressure of the evaporation plant being 0.1 atm., the compression suitably takes place to 0.25–0.30 atm. Gas-steam mixtures from the ejector are led to the direct condenser 54. To the same direct condenser 54 also is led the steam blown out from the effects 1, 2 and 3 via conduit 55. The steam condenses with circulating cooling water cooled in a heat exchanger 56. After traversing a condenser scrubber 54, the gases flow to the vacuum pump 57 and are compressed to atmospheric pressure. The vacuum pump outlined in FIG. 3 is a liquid ring pump, the sealing water of which is supplied through the conduit 58.

From the liquid separator 59 there then is obtained (a) a sealing water with a high sulphur dioxide content and (b) a strong sulphur dioxide gas which can be absorbed in water to an aqueous solution with a high content of dissolved sulphur dioxide.

In experiments with a vacuum system designed according to FIG. 3 the following degree of sulphur dioxide recovery is obtained. Release liquor obtained from sulphite cooking of high-yield bisulphite pulp with an ingoing dry content of 9 percent was subjected to evaporation in an evaporation plant comprising five effects. The sulphur dioxide quantity in the ingoing release liquor amounted to 1,320 kg of sulphur dioxide per hour. By sulphur balances of the ingoing release liquor and outgoing thick liquor the sulphur dioxide removal in the expansion vessels of the evaporation plant was calculated to 300 kg of sulphur dioxide per hour. Of this sulphur dioxide quantity there were lost 100 kg of sulphur dioxide which dissolved in the condensate and was led to the sewer. In the sealing water after the vacuum pump and in the sulphur dioxide solution after the absorption tower there were recovered 170 kg of sulphur dioxide as an aqueous solution containing 32 g of sulphur dioxide per liter. Of the sulphur dioxide quantity supplied with the release liquor 30 kg of sulphur dioxide could not be accounted for in outgoing flows.

We claim:

1. A method for recovering sulphur dioxide from sulphite waste liquors resulting from the cooking of material containing lignocellulose, by evaporation in the several effects of a multiple effect evaporator, in which the major portion of the vapor content of vent vapors boiled off in the evaporation from every effect is condensed and discharged, the remaining uncondensed gas and vapor, containing the greater part of the sulphur dioxide quantity removed in each of the effects, is cooled at a low pressure, the resulting condensate is discharged, and the resulting uncondensed gas rich in sulphur dioxide is compressed to atmospheric pressure in a vacuum pump of a type requiring no or only a small amount of sealing water, the method being further characterized in that the major portion of the vent vapor from the last two of the effects is cooled in a first direct condenser by contact with circulating liquid coolant thereby forming an aqueous condensate and a residual gas-vapor, whereafter the residual gas-vapor is compressed by a steam injector to a suitable pressure and is mixed with vent vapors from the remaining effects, the resulting mixture is led to a second direct condenser in which steam contained in the gas-vapor-steam mixture is condensed and the uncondensed gas, rich in sulphur dioxide, departing from said second direct condenser, then is compressed to atmospheric pressure in said vacuum pump.

2. An evaporation plant for sulphite liquor, for use in the recovery of sulphur dioxide, said evaporation plant comprising a plurality of evaporation effects in series, each effect including (1) a heat exchanger wherein waste liquor is heated, (2) an expansion vessel wherein vent vapor containing vapors, inert gases and sulphur dioxide is separated from heated waste liquor coming from the heat exchanger, (3) a condensate separator wherein vent vapor-gas coming from the expansion vessel of the previous effect is separated into an ejection stream of remaining gas-vapors including sulphur dioxide and into a stream of condensed water vapor, and (4) a circulation pump for moving waste liquor from one effect to the next, said evaporation plant comprising at least one direct contact condenser for cooling, under low pressure, ejection stream from a plurality of evaporation effects, and a vacuum pump, requiring only a small amount of sealing water, for compressing a gas rich in sulphur dioxide coming from said direct contact condenser via said expansion vessels, said plant being further characterized in that said first condenser is connected to a first conduit for receiving vent gas-vapors from the last two of the effects, and to a second conduit for transferring remaining gas-vapors from said first condenser to a steam ejector pump, and in which vent gas-vapors from the remaining effects are transferred to a second direct condenser through a third conduit connected thereto, to which second condenser also said gas-vapor mixture from said steam ejector pump is also led, the aforesaid vacuum pump being connected to the remaining gas-vapor offtake of said second direct condenser by a fourth conduit.

3. An evaporation plant according to claim 2, which further comprises two indirect heat exchangers for indirectly cooling re-circulating liquid coolant for the aforesaid first and second direct condensers.

4. An evaporation plant for sulfite liquor as defined in claim 2, in which the vacuum pump is a liquid ring vacuum pump connected to a conduit for supplying the sealing water of the pump and provided with a liquid separator and further provided with a down-stream liquid separator.

* * * * *